(12) United States Patent
Watanabe

(10) Patent No.: US 6,415,545 B1
(45) Date of Patent: Jul. 9, 2002

(54) ATTRACTANT MITICIDE AND CAPTURING DEVICE

(76) Inventor: Hideo Watanabe, 13-51 Minamino-Machi, Kitahirano, Himezi-shi, Hyogo (JP)

(*) Notice: Subject to any disclaimer, the term of this patent is extended or adjusted under 35 U.S.C. 154(b) by 0 days.

(21) Appl. No.: 09/653,256

(22) Filed: Aug. 31, 2000

(30) Foreign Application Priority Data

Sep. 17, 1999 (JP) .......................................... 11-263113

(51) Int. Cl.[7] .............................................. A01M 1/14
(52) U.S. Cl. ...................................................... 43/114
(58) Field of Search ................................... 43/114, 131

(56) References Cited

U.S. PATENT DOCUMENTS

| | | | | |
|---|---|---|---|---|
| 3,931,692 A | * | 1/1976 | Hermanson | 43/131 |
| 4,103,450 A | * | 8/1978 | Whitcomb | 43/131 |
| 4,879,837 A | * | 11/1989 | Capizzi et al. | 43/124 |
| 5,150,541 A | * | 9/1992 | Foster et al. | 43/131 |
| 5,359,808 A | * | 11/1994 | Fitsakis | 43/132.1 |
| 5,737,870 A | * | 4/1998 | Thind | 43/107 |
| 5,930,945 A | * | 8/1999 | Glenister et al. | 43/121 |
| 6,196,156 B1 | * | 3/2001 | Denesuk et al. | 119/28.5 |
| 6,224,890 B1 | * | 5/2001 | Heath et al. | 424/409 |

FOREIGN PATENT DOCUMENTS

| | | |
|---|---|---|
| JP | 6456674 | 4/1989 |
| JP | 1-290609 | 11/1989 |
| JP | A2215705 | 8/1990 |
| JP | 348474 | 5/1991 |
| JP | 5-37079 | 6/1993 |
| JP | 05310504 | 11/1993 |
| JP | 06009322 | 1/1994 |
| JP | 10052206 | 2/1998 |
| JP | 10117657 | 5/1998 |

* cited by examiner

Primary Examiner—Charles T. Jordan
Assistant Examiner—Jordan M. Lofdahl
(74) Attorney, Agent, or Firm—Birch, Stewart, Kolasch & Birch, LLP

(57) ABSTRACT

An attractant miticide and a capturing device containing the miticide to capture and exterminate mites that are implicated as a source of allergens in the home, without polluting the inhabited environment. The miticide is a mixture of a non-toxic feeding attractant, a non-toxic aromatic attractant and a non-toxic miticidal substance, which contains non-toxic feeding attractants such as beer yeast, chocolate, cheese, food scraps, rice malt, and the like. The food aroma additive-type ester-based aromatic attractant can be geranyl and the miticidal substance can be silica gel that absorbs moisture and generates heat to kill mites that have been attracted to eat the bait.

10 Claims, 3 Drawing Sheets

ATTRACTANT MITICIDE AND CAPTURING DEVICE

TECHNICAL FIELD OF THE INVENTION

The present invention relates to an attractant miticide and a capturing device for the elimination of parasites in the field of sanitation. In particular, the invention relates to a safe attractant miticide and a mite capturing device containing no harmful petroleum-based chemical substances.

BACKGROUND OF THE INVENTION

With the proliferation of mites in indoor carpets, straw mats, mattresses, beds, rugs, automobile fabrics, etc. in modern home environments, such mites are increasingly being implicated as the cause of atopic dermatitis, bronchial asthma and similar conditions.

As living styles become more Westernized, to include sashes and the like, environments are being provided that are more ideal for mites to live in and the proliferation of mites is promoted, such that it is becoming a major issue to deal with these health-threatening mites.

Methods for elimination of mites that have been proposed include the extermination of mites by spraying miticides that are chemical pesticides containing mixtures of petroleum-based chemical substances, and capturing mites using attractants.

Conventional miticides, however, are highly toxic and the extermination of mites by spraying of such chemicals has the side-effect of polluting the inhabited environment while also posing a risk for children and infants. They cannot be used on beddings, and therefore the mites are left undisturbed in their main living sites. In addition, cheletidaes and acarid mites are virtually unaffected by pesticides, and there has been no means of capturing and exterminating all such types of mites.

SUMMARY OF THE INVENTION

In view of the foregoing points and in order to solve the foregoing problems, it is a first object of the present invention to provide a safe attractant miticide and a mite capturing device, the attractant miticide comprising a mixture of a non-toxic feeding attractant, a non-toxic aromatic attractant and a non-toxic miticidal substance, and the mite capturing device being designed to capture mites by adhering the attractant miticide to a capturing pouch or capturing mat, while containing no harmful petroleum-based chemical substances.

It is thereby possible to capture, exterminate and eliminate mites without harmful petroleum-based chemical substances, without polluting the inhabited environment with toxins and without posing a risk to children and infants, it being also suitable for beddings which are the primary living sites of mites.

It is another object of the invention to provide an attractant miticide and capturing device comprising a food-flavored feeding attractant to attract different types of mites, a food aroma additive-type ester-based aromatic attractant such as geranyl, and a miticidal substance such as silica gel; this makes it possible to capture various types of mites and to eliminate a source of allergens.

It is yet another object of the invention to provide a mite capturing device designed to capture and kill mites, which is produced by forming a mite capturing device into a cushion-like, mat-like, sheet-like or rod-like capturing pouch or capturing mat using cotton or a knitted or nonwoven fabric which is easily penetrable by mites, and setting in the capturing device a non-toxic attractant miticide containing a non-toxic miticidal substance.

In particular there is provided a new, hitherto non-existent means allowing capture and elimination of mites by attraction to woven fabrics, nonwoven fabrics and cotton, which means can be easily set at locations that are the primary living sites of mites, such as near floors such as rugs, straw mats, etc., in beddings such as floor mattresses and bed mattresses, in indoor fabric products and the like, in a manner allowing easy approach by mites, to thus capture various types of mites and eliminate a source of allergens.

It is still yet another object of the invention to form a capturing device by adhering a non-toxic attractant miticide containing a non-toxic miticidal substance to a padding or other type of sheet by evenly spraying or coating, and inserting the sheet into a capturing pouch or wedging it into a capturing mat, thus allowing the mite capturing device to be easily fabricated and allowing mites to be attracted and captured without polluting the inhabited environment.

It is still yet another object of the invention to fabricate a mite capturing device by forming a capturing pouch or capturing mat of a slightly rough woven fabric such as a towel or knitted fabric, and attracting and capturing numerous mites of different types by non-toxic means and killing them regardless of their type.

It is still yet another object of the invention to display the condition of captured mites in a mite capturing device on an internet web site, so that the condition of captured mites can be viewed readily to promote sales of the mite capturing device. It is still yet another object of the invention to display the condition of captured mites on an internet web site along with an explanation of the method of using the mite capturing device in various locations, to allow the aforementioned effects to be exhibited by effective use of the mite capturing device by consumers.

The present invention will become apparent from the detailed description given hereinafter.

BRIEF DISCRIPTION OF THE DRAWINGS

DETAILED DESCRIPTION OF THE INVENTION

Figure 1:
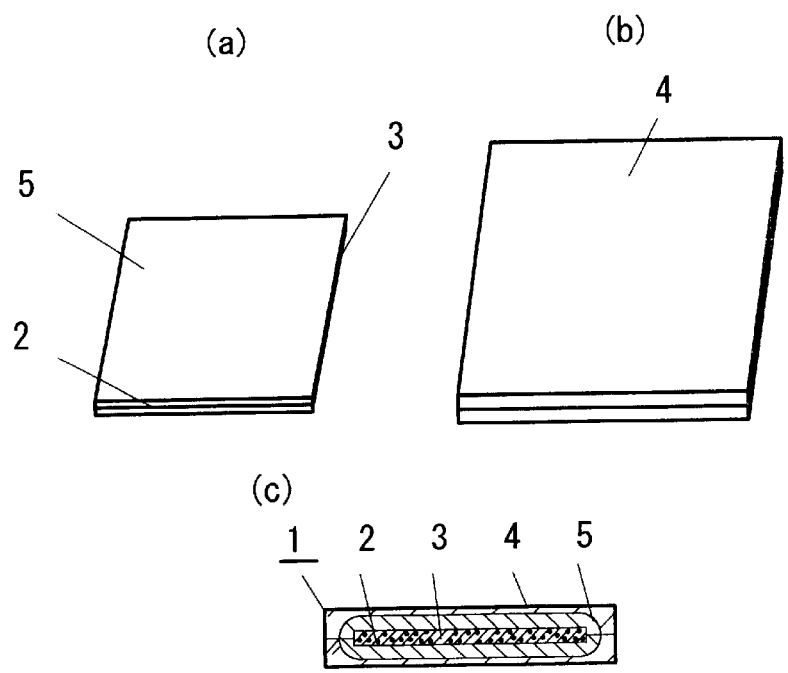
FIG. 1 is a perspective view (a) of the sheet insertion section according to an embodiment of a capturing device of the invention, a perspective view (b) of the capturing device and a cross-sectional view (c) of the capturing device with the sheet section inserted therein.

The present invention will be described in detail with reference to the accompanying drawings.

The features of the attractant miticide and capturing device of the invention reside in a miticide comprising a mixture of a non-toxic feeding attractant, a non-toxic aromatic attractant and a non-toxic miticidal substance, whereby mites are captured by setting the attractant miticide into a capturing pouch or capturing mat. The mite capturing device is preferably formed into a cushion-like, mat-like, sheet-like or rod-like capturing pouch or capturing mat using cotton or a knitted or nonwoven fabric which is easily penetrable by mites, and a non-toxic attractant miticide containing a non-toxic miticidal substance is preferably set in the capturing device to capture and kill the mites.

A variety of known mites are commonly detected in homes, including house dust mites, dermatophagoide farinaes, epidermoptidaes, oribatid mites, acarids, cheyletidaes, dust mites, tarsonemidaes, house ticks, and the like.

House dust mites feed on mold, plant fiber, waste materials containing unsaturated fatty acids, food scraps, etc., oribatid mites feed on mold and humus, acarids are food parasites that prefer cheese and food scraps, cheyletidaes live by predating the above-mentioned dust mites and oribatid mites and other minute insects, dust mites feed on food scraps, and especially dried and sun-dried seafood and pet food, tarsonemidaes live on dust and stored food, and house ticks are parasitic on rats and birds.

As the aforementioned non-toxic feeding attractant substances there are preferred food flavors such as dry beer yeast and the like, chocolate or cocoa powder, cheese, butter, biscuits, grain powder, rice malt, fiber scrap or pet food, either alone or in appropriate combinations, formulated to attract the aforementioned different types of mites.

As non-toxic aromatic attractants there are preferred animal and vegetable oils and fats, their esters with fatty acids, for example, salad oil, sesame oil, frying oil, ester-based food aroma additives such as geranyl, and esters of acetic acid, butyric acid and alcohols, either alone or in appropriate combinations, formulated to attract the aforementioned different types of mites.

As non-toxic miticidal substances there may be used porous substances such as silica gel, active carbon, zeolite and calcium chloride, moisture-absorbing substances or adsorption heat generating substances, either alone or in appropriate combinations.

In addition there may be added attractants such as pheromones, as well as negative ion-releasing ceramics purified from rare earth alloys and tourmaline, in order to attract and kill the widest range of mite types.

The feeding attractant, aromatic attractant, miticidal substance and other attractants may be combined and ground into a fine powder of 1–100 $\mu$(micron), and preferably 1–10 $\mu$, to prepare the miticide. This powder size is preferred because mites generally have a body length of 100–1000 $\mu$. The mixing ratio may be 10–80 wt %:5–20 wt %:10–50 wt %:0–10 wt %.

The feeding attractant is preferably made into a powder either alone or with the other attractants, the powder dissolved in the solvent of the aromatic attractant, and the mixture then immersed into the miticidal substance, dried and ground into a fine powder.

When various types of mites are attracted to the aromatic attractant and feeding attractant and consume them, the mites, which are known as "water insects", are killed by the nerve-paralyzing effect of the ester and the water absorbing heat of the silica gel.

Because mites usually live near the floor surface, such as in rugs and straw mats, in bedding such as floor mattresses and bed mattresses, or in gaps in indoor furniture such as fabric products, upholstered chairs, walls or other furniture, the miticide having the composition described above is preferably situated on or close to these living sites in the form of a cushion, sheet, mat or rod, in order to allow easy approach by the mites for their capture.

For example, as shown in FIG. 1, the attractant miticide 1 is evenly sprayed or coated for adhesion to a padding sheet 2 or the like, which is inserted into a capturing pouch 3 formed from a slightly rough fabric such as a towel or knitted fabric, or the sheet 2 is inserted via cotton or cloth 4 if necessary, to make a cushion-like mite capturing device 5.

Figure 2:
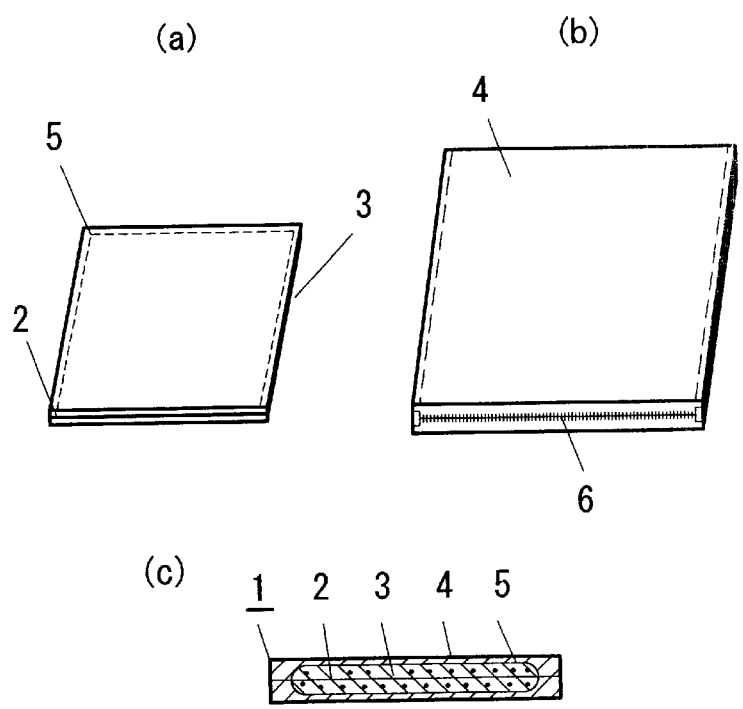
FIG. 2 is a perspective view (a) of another embodiment of the same, a perspective view (b) of the capturing device and a cross-sectional view (c) thereof with the sheet section inserted.

As shown in FIG. 2, the cotton, knitted fabric or cloth 4 is sealed on three sides and left open on one side, and the attractant miticide 1 is evenly sprayed in or coated inside through the opening for adhesion, and is inserted into a capturing pouch 3 with an open-and-close fastener 6 on one end, to complete the mite capturing device 5. According to this embodiment, the fastener 6 allows opening and closing to facilitate insertion of the cloth 4 or sheet 2, and the fastener 6 may be closed and left to stand.

Figure 3:
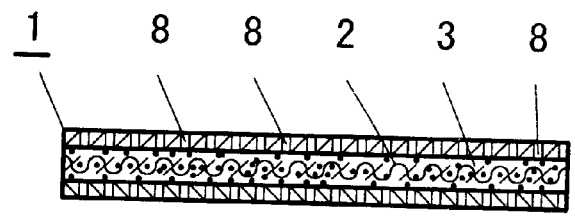
FIG. 3 is a cross-sectional view of a capturing mat according to another embodiment of the same.
Figure 4:
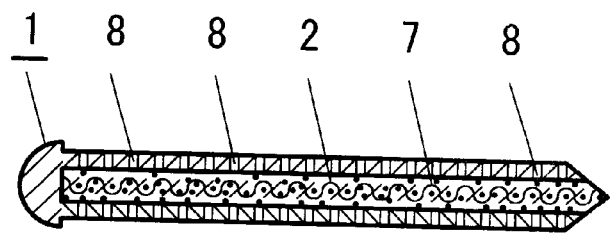
FIG. 4 is a cross-sectional view of a capturing rod according to another embodiment of the same.

As shown in FIG. 3 and FIG. 4, the cloth or cotton sheet 2 or rod 7 to which the attractant miticide 1 has been adhered by evenly spraying or coating may be formed into a capturing mat or capturing cylinder-type mite capturing device 5 provided with numerous fine holes 8 on the surface of a plastic sheet, paper, cloth or the like to allow the entrance of the mites.

Figure 5:
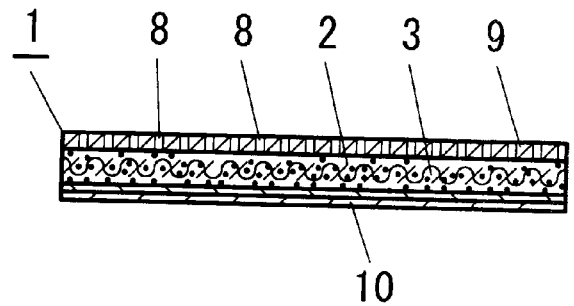
FIG. 5 is a cross-sectional view of a capturing mat according to still another embodiment of the same.

As shown in FIG. 5, a sheet 9 may be mounted on the cotton or cloth or the paper or plastic sheet with fine pores 8 that is provided for the entrance of the mites on the upper side of the cloth or cotton sheet 2 to which the attractant miticide 1 has been adhered by evenly spraying or coating, with a released adhesive sheet 10 on the lower side, to thus provide convenient capturing means in the form of a mat-like mite capturing device.

In the rod-shaped embodiment shown in FIG. 4, the head portion may be tapped to insert into a small gap to capture the mites. Here, the cross-section may be circular, elliptical, flat, etc.

Figure 6:
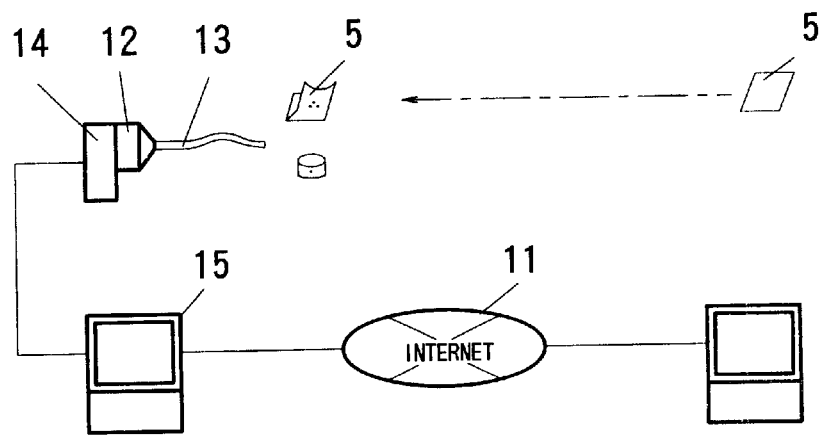
FIG. 6 is an illustrative diagram of the mite capturing device showing captured mites, etc. on an internet web site, according to another embodiment of the invention.

Most consumers never directly see mites and know nothing about their ecology. Mites are extremely small being about 100–1000 $\mu$ and are virtually invisible to the naked eye, and being almost transparent, they are difficult to distinguish Based on this information, therefore, the present inventors have designed a presentation of the captured condition of mites in the aforementioned mite capturing device 5 via a web site on the internet 11, as shown in FIG. 6, so that consumers can access the web site to view still images or moving images of the condition of captured mites, and can order and purchase the aforementioned mite capturing device 5.

In order to present the mites, for example, a microscope lens 12 with a magnification of 30–1200× is fitted on an optical fiber microscope 13 and connected to a digital camera 14, and the condition of capture mites is photographed either as still images or moving images; these may be stored on a personal computer 15 for loading onto the aforementioned web site.

Figure 7:
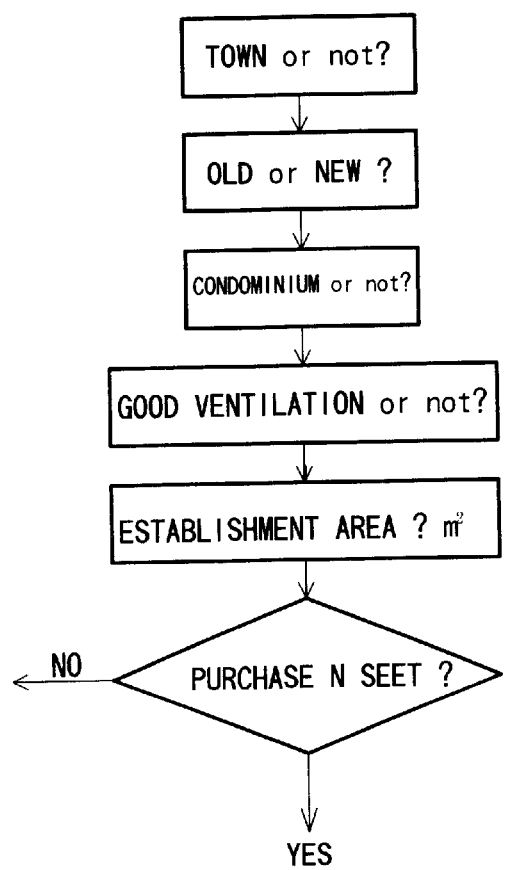
FIG. 7 is a flow chart according to an embodiment of purchase orders for the mite capturing device.

As shown in FIG. 7, the number of mite capturing devices used and the method of their use, to capture mites in various places by placing or wedging the mite capturing device 5 in a home environment or under a bed, rug, carpet, mat, cushion, mattress or the like, or on an automobile fabric or under the feet, may be displayed on a web site so that proper guidance can be provided through the web site for effective use of the mite capturing device 5.

Furthermore, a mite capturing device that has captured mites may be sent back to the vendor and the condition of captured mites may be displayed via e-mail, for guidance concerning particular captured mite conditions or future methods of use. The service may also be provided by sending videos or photographs instead of e-mail.

A powder was prepared from a mixture of food scraps of chocolate, cocoa, cheese, biscuits or the like, rice malt, etc. with food flavors such as beer yeast, a small amount of alcohol was added to a food aroma additive-type ester such as geranyl, and the feeding attractant was combined with the aromatic attractant. A porous silica gel miticide was immersed in the above-mentioned solution for impregnation. The proportion of the feeding attractant, aromatic attractant and miticide was approximately 1:0.5:0.5.

The mixture was dried and pulverized with a pulverizer to a size of about 1–100 $\mu$ and then evenly sprayed onto a 500×500 mm nonwoven sheet 2 as shown in FIG. 1, and this was inserted into a capturing pouch 3 formed of a slightly rough fabric such as a towel, through which mites can enter, and the device was set in a 10 $m^2$ room as a cushion-like mite capturing device 5.

As a result it was possible to capture and kill a total amount of 20 to 30 thousand mites of different types within about 2 months. It was therefore possible to capture and kill mites by a non-toxic means, to eliminate mite carcasses, feces and other allergen sources without harming the inhabited environment.

A request was made for a mite-capturing test at a development center, and devices were placed under beds and between straw mats and carpets in apartment complexes and houses. As a result, it was possible to capture numerous mites at the locations in which they were placed, and to kill the mites regardless of their type.

The types of mites that were captured included numerous house dust mites and tarsonemidaes, acarids and cheyletidaes, as well as house ticks, oribatid mites and booklice.

Examination of atopic dermatitis and allergy patients among these households revealed an improvement of 65–70%.

Thus, by combining together a non-toxic feeding attractant, a non-toxic aromatic attractant and a non-toxic miticide, it is possible to make a safe attractant miticide containing no harmful petroleum-based chemical substances, to exterminate mites that are a source of allergens in the home due to mite carcasses and feces without harming the inhabited environment, to effectively attract mites to a capturing device for capture and elimination without polluting the inhabited environment even though it is set in the living space, and to protect children and infants from these sources of allergens.

In addition, it is possible to attract and capture numerous mites with a mixture of feeding attractants such as food flavors, an ester-based aromatic attractant and a miticidal substance such as silica gel, in order to attract different types of mites.

The attractant miticide is also setted to a capturing pouch or capturing mat and the mite capturing device is placed on beddings, fabric products or gaps of furniture to attract and capture different types of mites in the same manner described above.

Furthermore, since the mite capturing device is formed into a cushion-like, mat-like, sheet-like or rod-like capturing pouch or capturing mat using cotton or a knitted or nonwoven fabric which is easily penetrable by mites, it can be easily set at locations that are the primary living sites of mites, such as near floors such as rugs, straw mats, etc., in beddings such as floor mattresses and bed mattresses, in indoor fabric products and the like, in a manner allowing easy approach by mites, and it can attract and capture mites effectively in the capturing device without polluting the inhabited environment even though it is set in the living space. Also by forming the capturing device by setting a non-toxic attractant containing a non-toxic miticidal substance to a padding or other type of sheet by evenly spraying or coating, or inserting the sheet into a capturing pouch or inserting it into a capturing mat, it is possible to easily fabricate a mite capturing device that allows mites to be attracted and captured.

Moreover, by forming the mite capturing device into a capturing pouch or capturing mat of a slightly rough woven fabric such as a towel or knitted fabric, it is possible to facilitate penetration of the mites into the capturing device to attract and capture numerous mites regardless of their type.

In addition, by combining the mite attractant with a food flavor and food scraps, rice malt and grown mite bodies or feces and pulverizing this into a powder, adding a small amount of a food aroma additive-type ester such as geranyl, mixing the feeding attractant and the aromatic attractant, impregnating this solution into a miticidal substance such as porous silica gel and forming a fine powder with a size of 1–100 $\mu$, it is possible to attract and capture numerous mites of different types by a non-toxic means and kill them regardless of their type, to eliminate mite carcasses, feces and other allergen sources without harming the inhabited environment.

Finally, by displaying the condition of captured mites in the mite capturing device on an internet web site, so that the condition of captured mites can be viewed through the internet to promote sales at the mite web site, it is possible to view still images or moving images of the condition of captured mites, and to order and purchase the mite capturing device through the internet.

What is claimed is:

1. A mite capturing device to capture and kill mites, which is produced by:

forming the mite capturing device into a capturing pouch or a capturing mat having a cushion shape, a mat shape, a sheet shape or a rod shape, the device being formed using cotton, a knitted fabric or a nonwoven fabric which is easily penetrable by mites; and setting a non-toxic attractant miticide in the device, the non-toxic attractant miticide containing a non-toxic miticidal substance, wherein the capturing device is formed by adhering the non-toxic attractant miticide containing the non-toxic miticidal substance to a padding or other sheet by evenly spraying or coating, and inserting the sheet into the capturing pouch or wedging it into the capturing mat.

2. A mite capturing device to capture and kill mites, which is produced by:

forming the mite capturing device into a capturing pouch or a capturing mat having a cushion shape, a mat shape, a sheet shape or a rod shape, the device being formed using cotton, a knitted fabric or a nonwoven fabric which is easily penetrable by mites; and setting a non-toxic attractant miticide in the device, the non-toxic attractant miticide containing a non-toxic miticidal substance, wherein the mite capturing device is formed into the capturing pouch or capturing mat made of a slightly rough woven fabric such as a towel or knitted fabric and contains the a non-toxic feeding attractant, a non-toxic aromatic attractant and the non-toxic miticidal substance, and the miticide is placed in the capturing device in the form of a fine powder with a size of 1–100 μ.

3. A mite capturing device to capture and kill mites, which is produced by:

forming the mite capturing device into a capturing pouch or mat having a cushion shape, a mat shape, a sheet shape or a rod shape, the device being formed using cotton, a knitted fabric or a nonwoven fabric which is easily penetrable by mites; and setting a non-toxic attractant miticide in the device, the non-toxic attractant miticide containing a non-toxic miticidal substance, wherein the miticide is formed by preparing a mixture of feeding attractant food flavors such as beer yeast, food scraps such as chocolate, cocoa, cheese or biscuits, or rice malt, in powder form, and a mixture of a food aroma additive ester aromatic attractant such as geranyl, mixing a solution of the feeding attractant and the aromatic attractant, impregnating the solution into the miticidal substance such as a porous silica gel and forming a fine powder with a size of 1–100 μ.

4. A mite capturing device, which comprises an attractant miticide, the miticide comprising a mixture of a non-toxic feeding attractant, a non-toxic aromatic attractant, and a non-toxic miticidal substance, wherein the miticide contains no harmful petroleum-based chemical substances, the non-toxic feeding attractant being formed by minute insects that are prey of cheyletidaes, food scraps and fiber scraps that house dustmites, acarids and tarsoemides, thereby attracting mites including cheylitidaes, house dust mites, tarsonemidaes, acarids or orbatid mites, the non-toxic aromatic attractant being formed of a food aroma additive ester-based aromatic attractant, the non-toxic feeding attractant, the non-toxic aromatic attractant, and the non-toxic miticidal substance being impregnated into a moisture-absorbing and heat-generating porous silica gel, and forming a fine powder, the powder being inserted into the capturing device, whereby mites consume the feeding attractant and are killed by the water absorbing heat of the silica gel.

5. The mite capturing device according to claim 4, wherein the ester-based aromatic attractant is geranyl.

6. The mite capturing device according to claim 4, wherein the non-toxic feeding attractant is formed by mixing and the minute insects that are prey of cheyletidaes, food flavors selected from the group consisting of beer yeast and food scraps (chocolate, cocoa, cheese, butter, biscuits, grain powder or rice malt), fiber scraps which house dust mites, acarids and tarsonemidaes, and pet food preferred by oribatid mites, the non-toxic attractant being formed from at least one of salad oil, sesame oil, frying oil of animal or vegetable oil or fats, ester-based food aroma additives, or esters of alcohol and acetic or butyric acid, the proportion of the non-toxic feeding attractant, aromatic attractant and miticide (including the silica gel) being about 1:0.5:0.5, and forming a fine powder of a size of about 1–100 μm.

7. The mite capturing device according to claim 4, wherein the capturing device is formed by adhering the non-toxic attractant containing the non-toxic miticidal substance to a padding or other sheet by evenly spraying or coating, and inserting the sheet into a capturing pouch or wedging the sheet into a capturing mat.

8. The mite capturing device according to claim 6, wherein the capturing device is formed by adhering the non-toxic attractant containing the non-toxic miticidal substance to a padding or other sheet by evenly spraying or coating, and inserting the sheet into a capturing pouch or wedging the sheet into a capturing mat.

9. The mite capturing device according to claim 4, wherein the mite capturing device is formed into a capturing pouch or capturing mat made of a slightly rough woven fabric, the woven fabric being a towel or knitted fabric, the slightly rough woven fabric containing the non-toxic feeding attractant, nontoxic aromatic attractant and non-toxic miticidal substance, and the miticide is placed in the capturing device as a fine powder having a size of about 1–100 μm.

10. The mite capturing device according to claim 6, wherein the mite capturing device is formed into a capturing pouch or capturing mat made of a slightly rough woven fabric, the woven fabric being a towel or knitted fabric, the slightly rough woven fabric containing the non-toxic feeding attractant, non-toxic aromatic attractant and non-toxic miticidal substance, and the miticide is placed in the capturing device as a fine powder having a size of about 1–100 μm.

* * * * *